US012754173B2

(12) United States Patent
Nagai et al.

(10) Patent No.: US 12,754,173 B2
(45) Date of Patent: Oct. 6, 2026

(54) MONITORING ANALYSIS DEVICE AND MONITORING ANALYSIS METHOD

(71) Applicant: SHIMADZU CORPORATION, Kyoto (JP)

(72) Inventors: Yusuke Nagai, Kyoto (JP); Yosuke Iwata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 703 days.

(21) Appl. No.: 18/105,398

(22) Filed: Feb. 3, 2023

(65) Prior Publication Data

US 2023/0314390 A1 Oct. 5, 2023

(30) Foreign Application Priority Data

Mar. 31, 2022 (JP) ................................ 2022-060514

(51) Int. Cl.

| | |
|---|---|
| ***G01N 30/86*** | (2006.01) |
| ***B01D 15/08*** | (2006.01) |
| ***G01N 30/14*** | (2006.01) |
| ***G01N 30/38*** | (2006.01) |
| *G01N 30/02* | (2006.01) |
| *G01N 30/06* | (2006.01) |

(52) U.S. Cl.

CPC ......... *G01N 30/8665* (2013.01); *B01D 15/08* (2013.01); *G01N 30/14* (2013.01); *G01N 30/38* (2013.01); *G01N 2030/027* (2013.01); *G01N 2030/067* (2013.01); *G01N 2030/385* (2013.01)

(58) Field of Classification Search

CPC .... G01N 30/8665; G01N 30/14; G01N 30/38; G01N 2030/027; G01N 2030/067; G01N 2030/385; G01N 30/86; B01D 15/08

See application file for complete search history.

(56) References Cited

U.S. PATENT DOCUMENTS

2018/0136186 A1 5/2018 Kanki

FOREIGN PATENT DOCUMENTS

| | | |
|---|---|---|
| JP | S57-211038 A | 12/1982 |
| JP | S63-032367 A | 2/1988 |
| JP | H04-132957 A | 5/1992 |
| JP | 6753536 B2 | 9/2020 |
| JP | 2021-063835 A | 4/2021 |
| JP | 2021-181438 A | 11/2021 |
| WO | 2016/163024 A1 | 10/2016 |

OTHER PUBLICATIONS

CN 2008008801 Translation (Year: 2008).*

Office Action in corresponding JP Application No. 2022-060514 dated Nov. 11, 2025, with English machine translation.

Office Action in corresponding JP Application No. 2022-060514 dated Mar. 17, 2026, with English machine translation.

* cited by examiner

*Primary Examiner* — Samuel P Siefke

(74) *Attorney, Agent, or Firm* — Renner, Otto, Boisselle & Sklar, LLP

(57) ABSTRACT

A monitoring analysis device includes an acquirer that sequentially acquires reaction products produced by a reactor, an analyzer that sequentially analyzes the reaction products acquired by the acquirer, a pre-processor that performs a pre-process to be performed before an analysis of the reaction products by the analyzer, and a controller that controls the pre-processor such that the pre-process for a second analysis to be performed subsequently to a first analysis is performed during the first analysis by the analyzer.

8 Claims, 5 Drawing Sheets

MONITORING ANALYSIS DEVICE AND MONITORING ANALYSIS METHOD

BACKGROUND

Technical Field

The present invention relates to a monitoring analysis device and a monitoring analysis method.

Description of Related Art

In recent years, the Process Analytical Technology (PAT) has been introduced in the oil industry and the chemical industry. In the Process Analytical Technology, successively produced reaction products are analyzed and managed. With the Process Analytical Technology, a reaction product in the course of manufacturing can be continuously inspected and monitored. On the other hand, in the pharmaceutical industry, introduction of the Process Analytical Technology has been considered. JP 6753536 B2 describes a flow vial that is used in monitoring of a manufacturing process such as process chemistry. According to JP 6753536 B2, a sample (reaction product) to be analyzed can be introduced into an analysis device on-line with use of a flow vial.

SUMMARY

When a reaction product is analyzed in the above-mentioned Process Analytical Technology, it is necessary to perform various pre-processes before starting one analysis. In this case, a great deal of time is consumed for the pre-processes. This reduces the frequency of an analysis performed on successively produced reaction products. In order to monitor changes in reaction products in detail, it is desirable to increase the frequency of an analysis performed in a certain period of time.

An object of the present invention is to provide a monitoring analysis device and a monitoring analysis method with which frequency of an analysis performed on successively produced reaction products can be improved.

A monitoring analysis device according to one aspect of the present invention includes an acquirer that sequentially acquires reaction products produced by a reactor, an analyzer that sequentially analyzes the reaction products acquired by the acquirer, a pre-processor that performs a pre-process to be performed before an analysis of the reaction products by the analyzer, and a controller that controls the pre-processor such that the pre-process for a second analysis to be performed subsequently to a first analysis is performed during the first analysis by the analyzer.

A monitoring analysis method according to another aspect of the present invention includes sequentially acquiring reaction products produced by a reactor, analyzing the acquired reaction products sequentially, and performing a pre-process to be performed before an analysis of the reaction products to be analyzed, wherein the performing a pre-process includes performing the pre-process for a second analysis to be performed subsequently to a first analysis during the first analysis in the analyzing.

Other features, elements, characteristics, and advantages of the present disclosure will become more apparent from the following description of preferred embodiments of the present disclosure with reference to the attached drawings.

DETAILED DESCRIPTION

A monitoring analysis device and a monitoring analysis method according to one embodiment of the present invention will be described below in detail with reference to the drawings.

(1) Configuration of Monitoring Analysis Device

Figure 1:
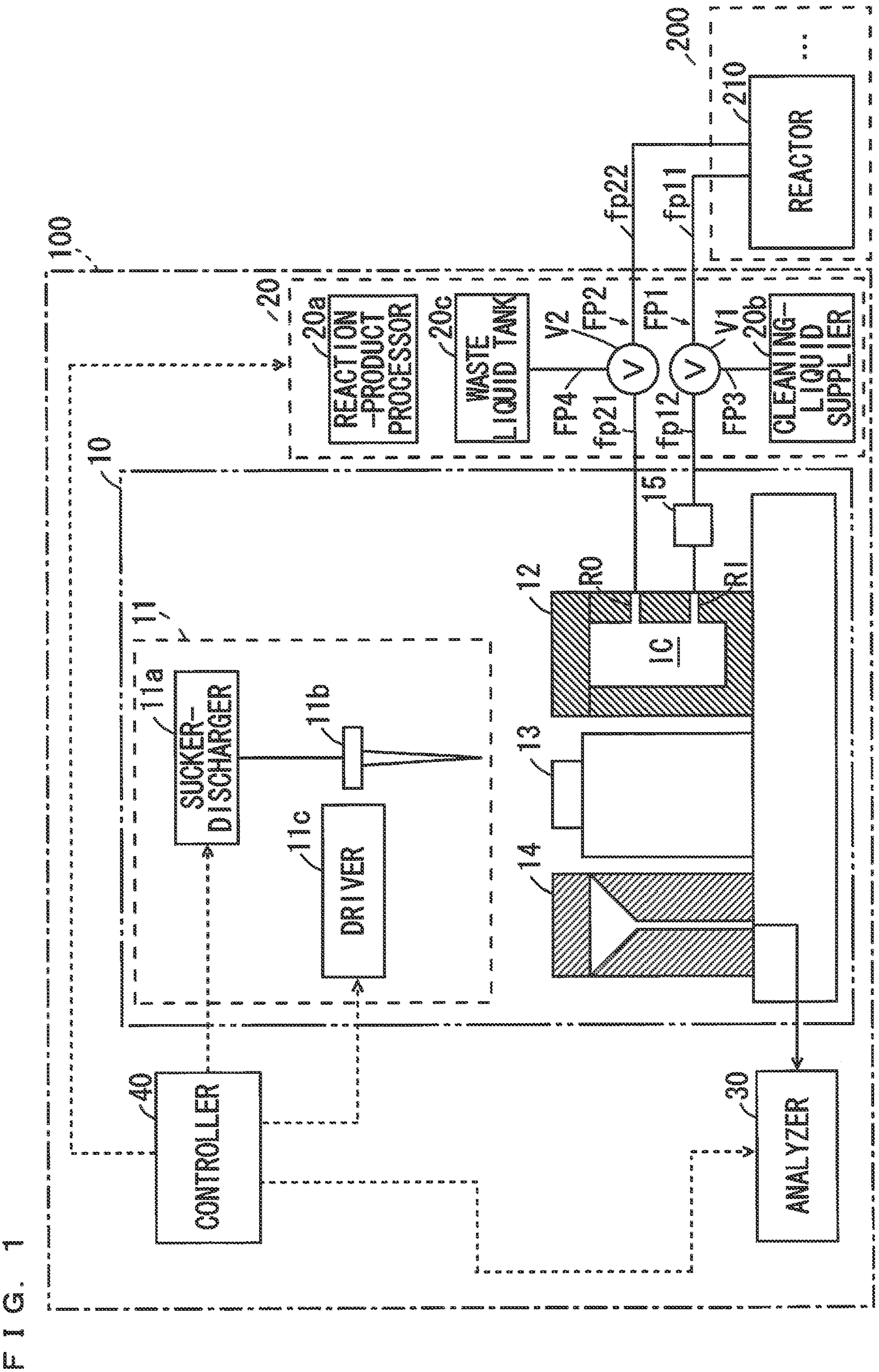
FIG. 1 is a diagram for explaining the configuration of a monitoring analysis device according to one embodiment.

FIG. 1 is a diagram for explaining the configuration of the monitoring analysis device according to one embodiment. A reaction system 200 includes a plurality of reactors 210. In the plurality of reactors 210, reaction products different from one other are sequentially produced. Here, the reaction products include not only final products but also include intermediate products. Further, the reaction products include a compound of a plurality of materials, a mixture of a plurality of materials, etc. For example, a reaction product is a mixture of a plurality of chemical agents.

The monitoring analysis device 100 is used to monitor reaction products produced by the plurality of reactors 210. The monitoring analysis device 100 includes an acquirer 10, a pre-processor 20, an analyzer 30 and a controller 40. The acquirer 10 is an autosampler, for example. The acquirer 10 includes a suction-discharge system 11, a plurality of sample acquisition containers (hereinafter referred to as flow vials) 12, a sample container 13 and an injection port 14. The suction-discharge system 11 includes a sucker-discharger 11*a*, a sampling needle 11*b* and a driver 11*c*. The sucker-discharger 11*a* includes a suction mechanism and a discharge mechanism, and is configured to be capable of sucking liquid into the sampling needle 11*b* and discharging liquid to the outside of the sampling needle 11*b*. The driver 11*c* is configured to move the sampling needle 11*b* among the plurality of flow vials 12, the sample container 13, the injection port 14 and the below-mentioned pre-processor 20. The pre-processor 20 includes a reaction-product processor 20*a*, a cleaning-liquid supplier 20*b*, a waste liquid tank 20*c*, a first switching valve V1 and a second switching valve V2.

The plurality of flow vials 12 are provided to correspond to the plurality of reactors 210. In the example of FIG. 1, a single reactor 210 and a single flow vial 12 are shown. An internal flow path IC, a first port (liquid inlet port) RI and a second port (liquid outlet port) RO are provided in the flow vial 12. One end of a first flow path FP1 and one end of a second flow path FP2 are connected to the first port RI and the second port RO, respectively. The reactor 210 is connected to the other end of the first flow path FP1 and the other end of the second flow path FP2.

In the present embodiment, the first and second switching valves V1, V2 of the pre-processor 20 are provided in the first and second flow paths FP1, FP2, respectively. The first switching valve V1 has two liquid inlet ports and one liquid outlet port. The second switching valve V2 has one liquid inlet port and two liquid outlet ports.

The first flow path FP1 includes flow-path portions fp11, fp12. The flow-path portion fp11 is connected between the first port RI of the flow vial 12 and the first switching valve V1. The flow-path portion fp11 is connected between the reactor 210 and one liquid inlet port of the first switching valve V1. The flow-path portion fp12 is connected between the liquid outlet port of the first switching valve V1 and the first port RI of the flow vial 12. The second flow path FP2 includes flow-path portions fp21, fp22. The flow-path portion fp21 is connected between the second port RO of the flow vial 12 and the liquid inlet port of the second switching valve V2. The flow-path portion fp22 is connected between one liquid outlet port of the second switching valve V2 and the reactor 210.

In the present embodiment, a filtering processor 15 is provided between the first port RI of the flow vial 12 and the first switching valve V1 in the flow-path portion fp12. The filtering processor 15 performs a filtering process of removing impurities and so on in a reaction product.

A third flow path FP3 is connected between the cleaning-liquid supplier 20*b* and the other liquid inlet port of the first switching valve V1. As a cleaning liquid, liquid such as pure water with which the internal flow path IC of the flow vial 12 and the first and second flow paths FP1, FP2 can be cleaned is used. A fourth flow path FP4 is connected between the other liquid outlet port of the second switching valve V2 and the waste liquid tank 20*c*.

The first switching valve V1 is configured to be switchable to a first state or a second state. In the first state, the flow-path portion fp11 and the flow-path portion fp12 are connected to each other. In the second state, the third flow path FP3 and the flow-path portion fp12 are connected to each other. Further, the second switching valve V2 is configured to be switchable to a third state or a fourth state. In the third state, the flow-path portion fp21 and the flow-path portion fp22 are connected to each other. In the second state, the flow-path portion fp21 and the fourth flow path FP4 are connected to each other.

In a case in which the first switching valve V1 is in the first state, and the second switching valve V2 is in the third state, reaction products sequentially produced by the reactor 210 pass through the first flow path FP1, the first port RI of the flow vial 12, the internal flow path IC, the second port RO and the second flow path FP2 in this order to be then guided to the reactor 210. Thus, the reaction products sequentially produced in the reactor 210 are continuously supplied into the reactor 210.

On the other hand, in a case in which the first switching valve V1 is in the second state, and the second switching valve V2 is in the fourth state, a cleaning liquid supplied by the cleaning-liquid supplier 20*b* passes through the third flow path FP3, the flow-path portion fp12 of the first flow path FP1, the first port RI of the flow vial 12, the internal flow path IC, the second port RO, the flow-path portion fp21 of the second flow path FP2 and the fourth flow path FP4 in this order to be then guided to the waste liquid tank 20*c*. Thus, the first flow path FP1, the flow vial 12 and the second flow path FP2 are cleaned. Hereinafter, this process is referred to as a cleaning process.

In the present embodiment, the first and second switching valves V1, V2 constitute a cleaner. The cleaner of the pre-processor 20 cleans the first flow path FP1, the second flow path FP2 and the flow vial 12 as a pre-process to be performed before an analysis by the analyzer 30.

In the present embodiment, the reaction-product processor 20*a* of the pre-processor 20 includes devices that perform a pre-process on a reaction product such as a re-dissolving device, a diluting device, a quenching device and an adding device. Because reaction products acquired from the reactor 210 may not be analyzable as they are since being precipitated from a solvent or having an excessively high concentration, the pre-process needs to be performed on each reaction product.

The re-dissolving device performs a re-dissolving process of re-dissolving a reaction product by applying physical vibration such as ultrasonic waves to the reaction product. The diluting device performs a diluting process of diluting a reaction product. The quenching device performs a quenching process of suppressing the reaction progress of a reaction product. In addition, a gas-liquid separating device performs a gas-liquid separating process of separating a reaction product into gas and liquid. The adding device performs an adding process of adding an internal standard sample for creating a calibration curve in the analyzer 30. Hereinafter, the re-dissolving process, the diluting process, the quenching process, the gas-liquid separating process and the adding process are collectively referred to as a reaction-product process. Further, an operation including the cleaning process and the reaction-product process, described above, is referred to as a pre-processing operation.

The reaction-product processor 20*a* performs one or a plurality of reaction-product processes on a reaction product in order to improve analytical accuracy. A reaction product on which a reaction-product process has been performed by the reaction-product processor 20*a* is referred to as a sample. In the present embodiment, all of the above-mentioned reaction-product processes are performed in the reaction-product processor 20*a*.

In the reaction-product process of the reaction-product processor 20*a*, a process may be suitably selected in accordance with the type of a reaction product produced by the reactor 210. Further, in a case in which it is not necessary to perform a reaction-product process on a reaction product produced by the reactor 210, the reaction-product process does not have to be performed by the pre-processor 20.

The sample container 13 is used to temporarily contain a sample acquired by the reaction-product processor 20*a*. A sample to be supplied to the analyzer 30 is injected by the sampling needle 11*b* into the injection port 14. The sample that has been injected into the injection port 14 is supplied to the analyzer 30.

The analyzer 30 analyzes the sample that has been supplied from the injection port 14. The analyzer 30 includes a chromatograph such as a liquid chromatograph or a supercritical fluid chromatograph, and a mass spectrometer. In the present embodiment, the analyzer 30 is a liquid chromatograph.

The controller 40 includes a CPU (Central Processing Unit), a RAM (Random Access Memory), a ROM (Read Only Memory), an input/output I/F (interface) and a storage device. A control program is stored in the ROM or the storage device. The CPU controls the suction-discharge system 11, the pre-processor 20 and the analyzer 30 by executing the control program stored in the ROM or the storage device on the RAM. A display unit, an operation unit and the like (not shown) are connected to the controller 40. When a user provides an instruction for analyzing a reaction product of the reactor 210 through the operation unit, the control of the controller 40 is started. In the present embodiment, a batch analysis is performed on a reaction product of the reactor 210. In the present embodiment, a batch file including an analysis condition, an analysis count and so on is registered in the controller 40 by the user. In the batch analysis of the present embodiment, an analysis is successively performed k times under a predetermined condition. k is an integer that is equal to or larger than 2.

(2) Control Operation of Controller 40

Figure 2:
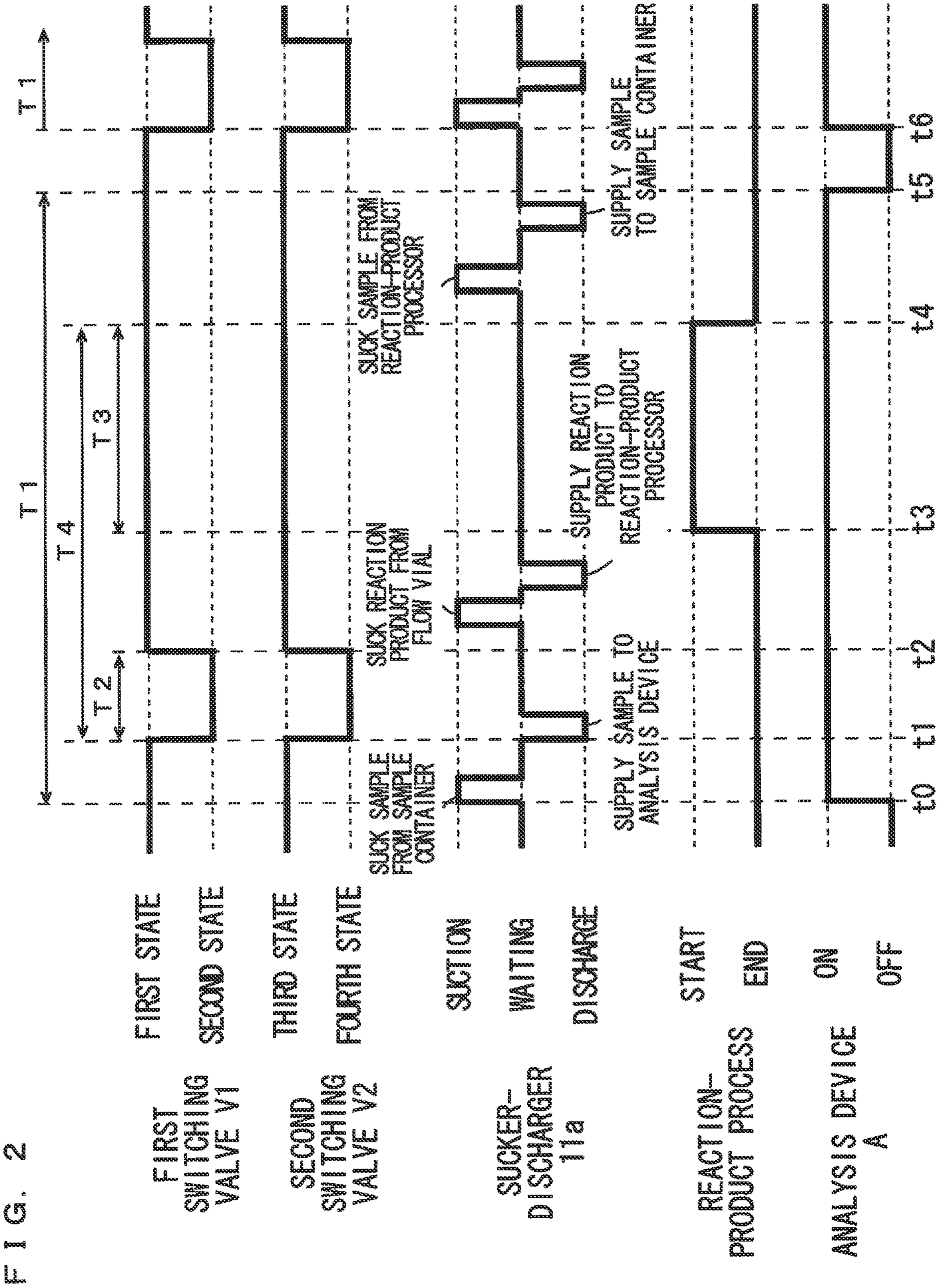
FIG. 2 is a timing chart showing the control operation of a controller in a chronological order.
Figure 3:
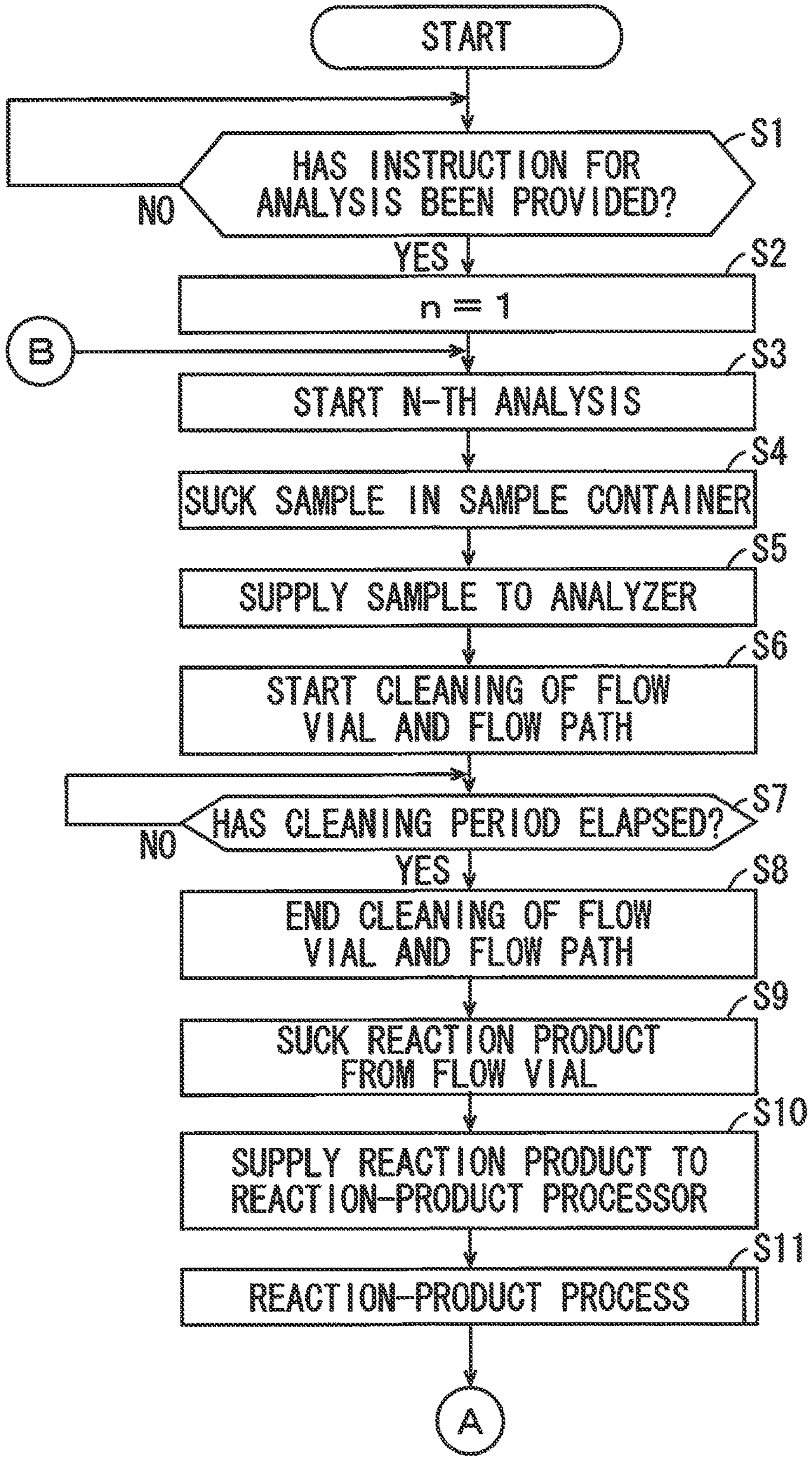
FIG. 3 is a flowchart showing the control operation of the controller.
Figure 4:
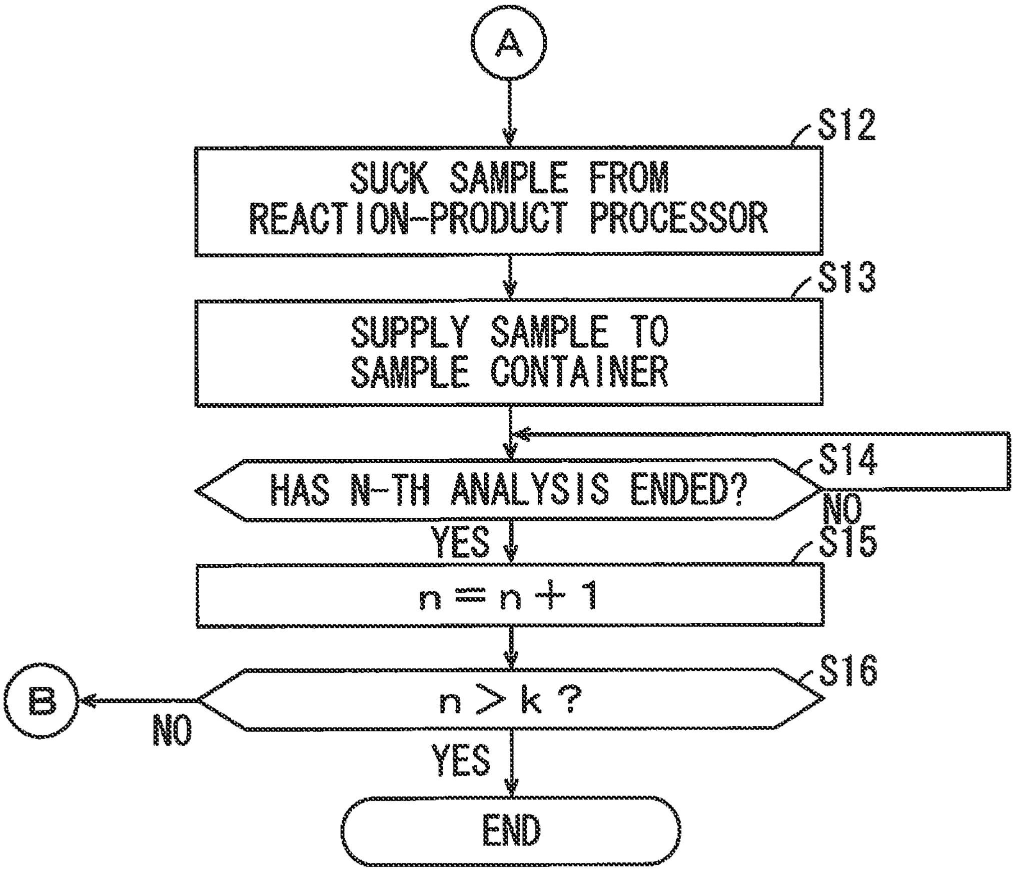
FIG. 4 is a flowchart showing the control operation of the controller.
Figure 5:
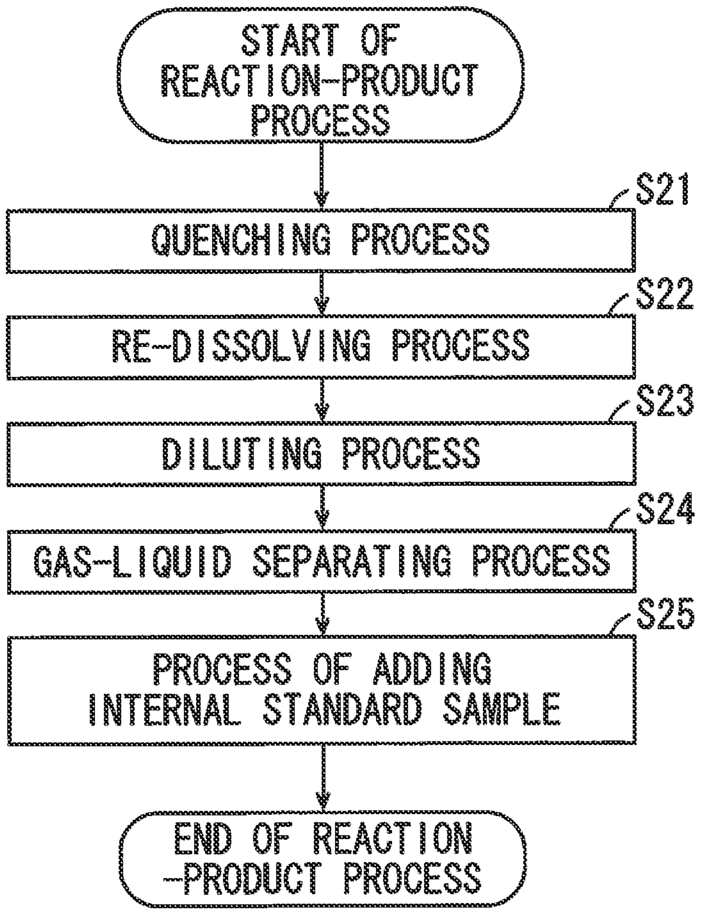
FIG. 5 is a flowchart showing the control operation of the controller.

FIG. 2 is a timing chart showing the control operation of the controller 40 in a chronological order. FIGS. 3 to 5 are flowcharts showing the control operation of the controller 40. In FIG. 2, suppose that a pre-processed sample is contained in the sample container 13 (see FIG. 1) at a point t0 in time.

First, the controller 40 determines whether the user has provided an instruction for performing an analysis of a reaction product supplied from the reactor 210 (the step S1 of FIG. 3). In a case in which the instruction has not been provided, the controller 40 waits until the instruction is provided. In a case in which the instruction is provided, the controller 40 sets a variable n to 1 (step S2). In this state, at the point t0 in time of FIG. 2, the analyzer 30 starts the n-th analysis (step S3). Hereinafter, the period from the point t0 to a point t5 in time, described below, is referred to as an analysis period T1.

The driver 11*c* moves the sampling needle 11*b* to a position above the sample container 13. At the point t0 in time, the sucker-discharger 11*a* sucks a sample contained in the sample container 13 using the sampling needle 11*b* (step S4). Next, the driver 11*c* moves the sampling needle 11*b* to a position above the injection port 14. At the point t1 in time, the sucker-discharger 11*a* injects the sample into the injection port 14 using the sampling needle 11*b* to supply the sample to the analyzer 30 (step S5).

Further, at the point t1 in time, the controller 40 switches the first switching valve V1 from the first state to the second state and switches the second switching valve V2 from the third state to the fourth state, thereby causing the cleaner of the pre-processor to start cleaning the flow vial 12 and the first and second flow paths FP1, FP2 (step S6).

The controller 40 determines whether a predetermined period (hereinafter referred to as a cleaning period T2) has elapsed from the point t1 in time (step S7). In a case in which the cleaning period T2 has not elapsed from the point t1 in time, the flow vial 12 and the first and second flow paths FP1, FP2 continue to be cleaned. In a case in which the cleaning period T2 has elapsed from the point t1 in time, the controller 40 switches the first switching valve V1 from the second state to the first state and switches the second switching valve V2 from the fourth state to the third state, thereby ending cleaning of the flow vial 12 and the first and second flow paths FP1, FP2 at the point t2 in time (step S8).

At this time, a reaction product is supplied from the reactor 210 into the flow vial 12. Next, the driver 11*c* moves the sampling needle 11*b* to a position above the flow vial 12. The sucker-discharger 11*a* sucks the reaction product in the flow vial 12 using the sampling needle 11*b* (step S9).

Thereafter, the driver 11*c* moves the sampling needle 11*b* to the reaction-product processor 20*a* of the pre-processor 20*a*. The sucker-discharger 11*a* supplies the reaction product from the sampling needle 11*b* to the reaction-product processor 20*a* (step S10).

At a point t3 in time later than the point t2 in time, the reaction-product processor 20*a* starts the above-mentioned reaction-product process (step S11). The reaction-product process is performed between the points t3 and t4 in time. Hereinafter, the period during which the reaction-product process is performed is referred to as a reaction-product processing period T3. Further, the period from the point t1 to the point t4 in time is referred to as a pre-processing period t4. As shown in FIG. 2, the pre-processing period T4 includes the cleaning period T2 and the reaction-product processing period T3.

FIG. 5 shows the reaction-product process of the reaction-product processor 20*a* of the pre-processor 20 in the present embodiment. In the timing chart of FIG. 2 and the flowchart of FIG. 5, the movement of the sampling needle 11*b* among the re-dissolving device, the diluting device, the quenching device, the gas-liquid separating device and the adding device of the reaction-product processor 20*a* and an operation of sucking or discharging a reaction product performed by the sampling needle 11*b* are not shown.

In the present embodiment, in the reaction-product processor 20*a* of the pre-processor 20, the quenching device first performs the quenching process on a reaction product (step S21). Next, the re-dissolving device starts the re-dissolving process on the reaction product (step S22). The diluting device performs the diluting process on the reaction product (step S23). Further, the gas-liquid separating device performs the gas-liquid separating process on the reaction product (step S24). Next, the adding device performs the adding process on the reaction product (step S25). At the point t4 in time of FIG. 2, the reaction-product process ends.

Next, the sucker-discharger 11*a* sucks the reaction product as a sample from the reaction-product processor 20*a* of the pre-processor 20 using the sampling needle 11*b* (step S12 of FIG. 4). Thereafter, the driver 11*c* moves the sampling needle 11*b* to a position above the sample container 13. The sucker-discharger 11*a* supplies the sample sucked by the sampling needle 11*b* to the sample container 13 (step S13).

The controller 40 determines whether the n-th analysis by the analyzer 30 has ended (step S14). In a case in which the n-th analysis by the analyzer 30 has not ended, the controller 40 waits until the n-th analysis by the analyzer 30 ends. In a case in which the n-th analysis by the analyzer 30 has ended (the point t5 in time of FIG. 2), the controller adds 1 to the value of the variable n (step S15). Here, the controller 40 determines whether the value of the variable n is larger than the analysis count k (step S16). In a case in which the value of the variable n is equal to or smaller than the analysis count k, the process returns to the step S3. Thus, the (n+1)th analysis is started at a point t6 in time later than the point t5 in time.

In a case in which the value of the variable n is larger than the analysis count k in the step S16, the operation of the controller 40 ends. Thus, the batch analysis in which an analysis is performed k times ends.

(3) Effects of Embodiments

With the monitoring analysis device 100 of the above-mentioned embodiment, the pre-process for the next analysis is performed in the analysis period T1 in one analysis. In this case, the pre-process for the next analysis is performed in parallel with the analysis operation for the one analysis. This can shorten the period of time from the end of the one analysis to the start of the next analysis in the analyzer. As a result, it is possible to improve the frequency of an analysis performed on successively produced reaction products.

The pre-process includes the cleaning process. This prevents a reaction product to be analyzed in the one analysis from being mixed with a reaction product to be analyzed in the next analysis.

Further, in the present embodiment, it is possible to switch between supply of a reaction product to the flow vial 12 and the cleaning process with simple configuration and control by switching the first and second switching valves V1, V2.

Further, the pre-process includes a reaction-product process. This enables acquisition of an accurate result of analysis and improvement of frequency of an analysis performed on successively produced reaction products.

Further, the monitoring analysis device 100 includes the filtering processor 15, thereby being capable of removing impurities of a reaction product. This enables acquisition of an accurate result of analysis while improving frequency of an analysis performed on successively produced reaction products.

Further, since the reaction-product process includes the re-dissolving process, a reaction product can be kept being dissolved. Thus, it is possible to acquire a more accurate result of analysis while improving frequency of an analysis performed on successively produced reaction products.

Further, since including the quenching process, the reaction-product process can stabilize the state of a reaction product. Therefore, it is possible to improve frequency of an analysis performed on successively produced reaction products.

Further, since the reaction-product process includes the diluting process, the concentration of a reaction product can be adjusted for an analysis by the analyzer. Therefore, it is possible to acquire a more accurate result of analysis while improving frequency of an analysis performed on successively produced reaction products.

Further, since the reaction-product process includes the gas-liquid separating process, gas mixed in a reaction product can be removed. Therefore, it is possible to acquire a more accurate result of analysis while improving frequency of an analysis performed on successively produced reaction products.

Further, since the reaction-product process includes the adding process, a standard sample can be added to a reaction product. Therefore, it is possible to acquire a more accurate result of analysis while improving frequency of an analysis performed on successively produced reaction products.

(4) Other Embodiments

While the quenching process, the re-dissolving process, the diluting process, the gas-liquid separating process and the adding process are performed in this order in the reaction-product process in the reaction-product processor 20*a* in the above-mentioned embodiment, the present invention is not limited to this. In the reaction-product process, the order of processes may be suitably changed according to the type of a reaction product.

(5) Aspects

It will be appreciated by those skilled in the art that the exemplary embodiments described above are illustrative of the following aspects.

(Item 1) A monitoring analysis device according to one aspect includes an acquirer that sequentially acquires reaction products produced by a reactor, an analyzer that sequentially analyzes the reaction products acquired by the acquirer, a pre-processor that performs a pre-process to be performed before an analysis of the reaction products by the analyzer, and a controller that controls the pre-processor such that the pre-process for a second analysis to be performed subsequently to a first analysis is performed during the first analysis by the analyzer.

With the monitoring analysis device according to item 1, the pre-process for the second analysis is performed in parallel with the first analysis of a reaction product. This can shorten the period of time from the end of the one analysis to the start of the next analysis in the analyzer. As a result, it is possible to improve the frequency of an analysis performed on successively produced reaction products.

(Item 2) The monitoring analysis device according to item 1, wherein the acquirer may include a sample acquisition container having an inner flow path and having first and second ports that respectively communicate with the inner flow path, a first flow path that guides a reaction product produced by the reactor to the first port of the sample acquisition container, and a second flow path that guides a reaction product to outside of the sample acquisition container from the second port of the sample acquisition container.

With the monitoring analysis deice according to item 2, reaction products can be acquired with a simple configuration, and contamination of sequentially acquired reaction products can be prevented.

(Item 3) The monitoring analysis device according to item 2, wherein the pre-process may include a cleaning process of cleaning the acquirer, and the pre-processor may include a cleaner that performs the cleaning process.

With the monitoring analysis device according to item 3, the acquirer is cleaned in parallel with the first analysis of a reaction product. This enables improvement of frequency of an analysis performed on successively produced reaction products while preventing a reaction product to be analyzed in the first analysis from being mixed with a reaction product to be analyzed in the second analysis.

(Item 4) The monitoring analysis device according to item 3, wherein the cleaner may be configured to clean the first flow path, the second flow path and the inner flow path of the sample acquisition container, and the cleaner may be configured to cause a cleaning liquid to flow through the first flow path, the inner flow path of the sample acquisition container and the second flow path.

With the monitoring analysis device according to item 4, the first flow path, the inner flow path of the sample acquisition container and the second flow path can be cleaned with a simple operation, and the frequency of an analysis performed on successively produced reaction products can be improved.

(Item 5) The monitoring analysis device according to item 4, wherein the cleaner may further include a first switching valve provided in the first flow path, and a second switching valve provided in the second flow path, the first switching valve may be configured to be selectively switchable to a first state in which a reaction product is flowable from the reactor to the first port or a second state in which an inflow of a reaction product from the reactor to the first port is preventable and a cleaning liquid is flowable to the first port through the first flow path, the second switching valve may be configured to be selectively switchable to a third state in which a reaction product is flowable from the second port to the reactor or a fourth state in which an outflow of a reaction product from the second port to the reactor is preventable and a cleaning liquid is dischargeable from the second port through the second flow path, and the controller may switch the first switching valve to the second state and may switch the second switching valve to the fourth state during acquisition of a reaction product from the reactor, and may switch the first switching valve to the second state and may switch the second switching valve to the fourth state during the cleaning process.

With the monitoring analysis device according to item 5, in a case in which the first switching valve is in the first state, and the second switching valve is in the third state, a reaction product flows into the inner flow path of the sample acquisition container through the first flow path from the reactor, and the reaction product in the inner flow path of the sample acquisition container flows out to the reactor through the second flow path. Further, in a case in which the first switching valve is in the second state, and the second switching valve is in the fourth state, a cleaning liquid flows through the first flow path, the inner flow path of the sample acquisition container and the second flow path. In this case, it is possible to switch between acquisition of a reaction product by the acquirer and cleaning of the acquirer with simple configuration and control by switching the first and second switching valves.

(Item 6) The monitoring analysis device according to items 1 to 5 may include a filtering processor that removes impurities of the reaction product between the reactor and the acquirer.

With the monitoring analysis device according to item 6, because impurities of a reaction product to be analyzed next are removed in parallel with the preceding analysis, it is possible to acquire a more accurate result of analysis while improving frequency of an analysis performed on successively produced reaction products.

(Item 7) The monitoring analysis device according to any one of items 1 to 6, wherein the pre-process may include a reaction-product process to be performed before an analysis by the analyzer for improvement of analysis accuracy on the reaction product that has been acquired by the acquirer, and the pre-processor may include a reaction-product processor that performs the reaction-product process.

With the monitoring analysis device according to item 7, the reaction-product process to be performed on a reaction product before the second analysis is performed in parallel with the first analysis of the reaction product. This enables acquisition of an accurate result of analysis and improvement of frequency of an analysis performed on successively produced reaction products.

(Item 8) The monitoring analysis device according to item 7, wherein the reaction-product process may include a re-dissolving process of promoting re-dissolution of the reaction product by applying physical vibration to the reaction product.

With the monitoring analysis device according to item 8, because a reaction product to be analyzed next can be kept dissolved in parallel with the preceding analysis, it is possible to acquire a more accurate result of analysis while improving frequency of an analysis performed on successively produced reaction products.

(Item 9) The monitoring analysis device according to item 7 or 8, wherein the reaction-product process may include a clenching process of suppressing reaction progress of the reaction product.

With the monitoring analysis device according to item 9, because a reaction product to be analyzed next can be stabilized in parallel with the preceding analysis, it is possible to acquire a more accurate result of analysis while improving frequency of an analysis performed on successively produced reaction products.

(Item 10) The monitoring analysis device according to any one of items 7 to 9, wherein the reaction-product process may further include a diluting process of diluting the reaction product.

With the monitoring analysis device according to item 10, because the concentration of a reaction product to be analyzed next can be adjusted for an analysis in parallel with the preceding analysis, it is possible to acquire a more accurate result of analysis performed on a reaction product while improving frequency of an analysis performed on successively produced reaction products.

(Item 11) The monitoring analysis device according to any one of items 7 to 10, wherein the reaction-product process may include a gas-liquid separating process of separating the reaction product into gas and liquid.

With the monitoring analysis device according to item 11, because gas mixed in a reaction product to be analyzed next can be removed in parallel with the preceding analysis, it is possible to acquire an accurate result of analysis while improving frequency of an analysis performed on successively produced reaction products.

(Item 12) The monitoring analysis device according to any one of items 7 to 11, wherein the reaction-product process may include an adding process of adding a standard sample to the reaction product in order to enable creation of a calibration curve in the analyzer.

With the monitoring analysis device according to item 12, because a standard sample can be added to a reaction product to be analyzed next can be removed in parallel with the preceding analysis, it is possible to acquire a more accurate result of analysis while improving frequency of an analysis performed on successively produced reaction products.

(Item 13) A monitoring analysis method according to another aspect includes sequentially acquiring reaction products produced by a reactor, analyzing the acquired reaction products sequentially, and performing a pre-process to be performed before an analysis of the reaction products to be analyzed, wherein the performing a pre-process includes performing the pre-process for a second analysis to be performed subsequently to a first analysis during the first analysis in the analyzing.

With the monitoring analysis device according to item 13, the pre-process for the second analysis is performed in parallel with the first analysis of a reaction product. This can shorten the period of time from the end of one analysis to the start of the next analysis.

As a result, it is possible to improve the frequency of an analysis performed on successively produced reaction products.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A monitoring analysis device comprising:

an acquirer, an analyzer, a pre-processor, and a controller, wherein the controller is programmed to:

control the acquirer to sequentially acquire reaction products produced by a reactor;

control the analyzer to sequentially analyze the reaction products acquired by the acquirer;

control the pre-processor to perform a pre-process to be performed before an analysis of the reaction products by the analyzer; and control the pre-processor such that the pre-process for a second analysis to be performed subsequently to a first analysis is performed during the first analysis by the analyzer, the acquirer includes:

a sample acquisition container having an inner flow path and having first and second ports that respectively communicate with the inner flow path, a first flow path that guides a reaction product produced by the reactor to the first port of the sample acquisition container, and a second flow path that guides a reaction product to outside of the sample acquisition container from the second port of the sample acquisition container, the pre-process includes a cleaning process of cleaning the acquirer, the pre-processor includes a cleaner that is configured to clean the first flow path, the second flow path and the inner flow path of the sample acquisition container by causing a cleaning liquid to flow through the first flow path, the inner flow path of the sample acquisition container and the second flow path as the cleaning process, the cleaner includes:

a first switching valve provided in the first flow path, and a second switching valve provided in the second flow path, wherein the first switching valve is configured to be selectively switchable to a first state in which the reaction product is flowable from the reactor to the first port or a second state in which an inflow of the reaction product from the reactor to the first port is preventable and the cleaning liquid is flowable to the first port through the first flow path, the second switching valve is configured to be selectively switchable to a third state in which the reaction product is flowable from the second port to the reactor or a fourth state in which an outflow of the reaction product from the second port to the reactor is preventable and the cleaning liquid is dischargeable from the second port through the second flow path, and the controller is further programmed to control the cleaner to:

switch the first switching valve to the first state and switch the second switching valve to the third state to acquire the reaction product from the reactor, and switch the first switching valve to the second state and switch the second switching valve to the fourth state to cause the cleaner to perform the cleaning process.

2. The monitoring analysis device according to claim 1, including a filtering processor that removes impurities of the reaction product between the reactor and the acquirer.

3. A monitoring analysis device comprising:

an acquirer, an analyzer, a pre-processor, a suction-discharge system, and a controller, wherein the controller is programmed to:

control the acquirer to sequentially acquire reaction products produced by a reactor;

control the analyzer to sequentially analyze the reaction products acquired by the acquirer;

control the pre-processor to perform a pre-process to be performed before an analysis of the reaction products by the analyzer; and control the pre-processor such that the pre-process for a second analysis to be performed subsequently to a first analysis is performed during the first analysis by the analyzer, the pre-process includes a reaction-product process to be performed before the analysis by the analyzer for improvement of analysis accuracy on the reaction product that has been acquired by the acquirer, the reaction-product process is a process of varying physical properties of the reaction product, the pre-processor includes a reaction-product processor that is provided separately from the acquirer, and the controller is further programmed to:

control the reaction-product processor to perform the reaction product process; and control the suction-discharge system such that the reaction product before the analysis by the analyzer is moved between the acquirer and the reaction-product processor.

4. The monitoring analysis device according to claim 3, wherein the reaction-product process includes a re-dissolving process of promoting re-dissolution of the reaction product by applying physical vibration to the reaction product, and the controller is programmed to control the reaction-product processor to perform the re-dissolving process.

5. The monitoring analysis device according to claim 3, wherein the reaction-product process includes a clenching process of suppressing reaction progress of the reaction product, and the controller is programmed to control the reaction-product processor to perform the clenching process.

6. The monitoring analysis device according to claim 3, wherein the reaction-product process further includes a diluting process of diluting the reaction product, and the controller is programmed to control the reaction-product processor to perform the diluting process.

7. The monitoring analysis device according to claim 3, wherein the reaction-product process includes a gas-liquid separating process of separating the reaction product into gas and liquid, and the controller is programmed to control the reaction-product processor to perform the gas-liquid separating process.

8. The monitoring analysis device according to claim 3, wherein the reaction-product process includes an adding process of adding a standard sample to the reaction product in order to enable creation of a calibration curve in the analyzer, and the controller is programmed to control the reaction-product processor to perform the adding process.

* * * * *